US000001272H

United States Statutory Invention Registration [19]

[11] Reg. Number: H1272

[43] Published: Jan. 4, 1994

Machado et al.

[54] QUICK DISCONNECT PRESSURE CAP

[75] Inventors: Peter Machado, Fairhaven, Mass.; James P. Muzaca, Tiverton, R.I.

[73] Assignee: The United States of America as represented by the Secretary of the Navy, Washington, D.C.

[21] Appl. No.: 590,182

[22] Filed: Sep. 28, 1990

[51] Int. Cl.[5] ..... F16L 37/18

[52] U.S. Cl. ..... 285/315

[58] Field of Search ..... 285/315, 38

[56] References Cited

U.S. PATENT DOCUMENTS

| | | | |
|---|---|---|---|
| 1,820,703 | 8/1931 | Hungerford | 285/315 X |
| 4,443,028 | 4/1984 | Hayes | 285/38 |
| 4,790,571 | 12/1986 | Montanari | 285/315 X |

FOREIGN PATENT DOCUMENTS

| | | | |
|---|---|---|---|
| 2425004 | 12/1974 | Fed. Rep. of Germany | 285/315 |
| 1034886 | 8/1953 | France | 285/315 |
| 1208967 | 2/1960 | France | 285/38 |
| 484768 | 5/1938 | United Kingdom | 285/315 |

*Primary Examiner*—Michael J. Carone
*Attorney, Agent, or Firm*—Michael J. McGowan; Prithvi C. Lall; Michael F. Oglo

[57] ABSTRACT

A closure for the end of a male quick disconnect fluid coupling has an internal plug that displaces the plug normally provided in the male quick disconnect coupling, and the closure also has an outer plug wall with balls that can be radially cammed inwardly by a rotatable sleeve on the closure.

5 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

QUICK DISCONNECT PRESSURE CAP

STATEMENT OF GOVERNMENT INTEREST

The invention described herein may be manufactured and used by or for the government of the United States of America for governmental purposes without payment of any royalties thereon or therefor.

BACKGROUND OF THE INVENTION

1. Field of the Invention

This invention generally relates to fluid couplings and more particularly to a self-sealing, quick disconnect (QD) cap for a male coupling to isolate it from external pressures.

2. Description of the Prior Art

Standard self-sealing couplings for fluids are designed to seal themselves from internal pressures only. However, in a Vertical Launch System (VLS), the missile tube has a quick disconnect coupling located therein. When a Capsule Launch System (CLS) is loaded into the missile tube, a sensing line from the CLS is connected to the QD coupling forming a path from the missile tube's differential pressure transducer to the CLS. However, when a ballast cam is loaded into the missile tube in place of a CLS, no sensing line is connected to the missile tube's QD coupling and the QD coupling's self-sealing plunger could be subjected to an external pressure. This situation can arise in the event of a flooded tube. If the plunger is opened under this circumstance, it would subject the different pressure transducer to sea pressure which would destroy it. There is thus a need for a pressure cap on the coupling which protects the differential transducer and the QD coupling against an external pressure.

SUMMARY OF THE INVENTION

This invention relates generally to fluid couplings, and deals more specifically with a cap or closure for the male portion of such a coupling for use when the coupling is not connected to a female coupling portion in order to prevent any external fluid pressure from entering the line to which the male coupling is secured.

In accordance with conventional fluid coupling design the male coupling portion is of annular shape, and has an external surface of revolution that includes an outwardly facing annular groove spaced from the end of the male coupling. An internal surface of revolution includes an inwardly facing annular groove fitted with an O-ring seal. This annular male coupling end portion is adapted to be closed with a pressure tight cap that includes a plug having an inner portion adapted to be received inside the male coupling, and having an outer annular wall cooperating with this inner plug portion to define an annular slot for receiving the annular end of the male coupling.

The outer wall of the plug has openings for receiving ball elements that are adapted to move radially in these openings so that these ball elements have portions that can project inwardly of the outer plug wall and into the above-mentioned annular slot.

A ball biasing sleeve is threadably received on the plug for movement between first and second axially spaced positions relative to the plug. The sleeve includes an annular camming surface for biasing the ball elements radially inwardly as the sleeve is threaded in one direction on the plug.

The plug inner portion has an external cylindrical surface of such a diameter that the O-ring of the male fluid coupling portion seals against it as the sleeve is so threaded on the plug.

DESCRIPTION OF THE PREFERRED EMBODIMENT

Figure 1:
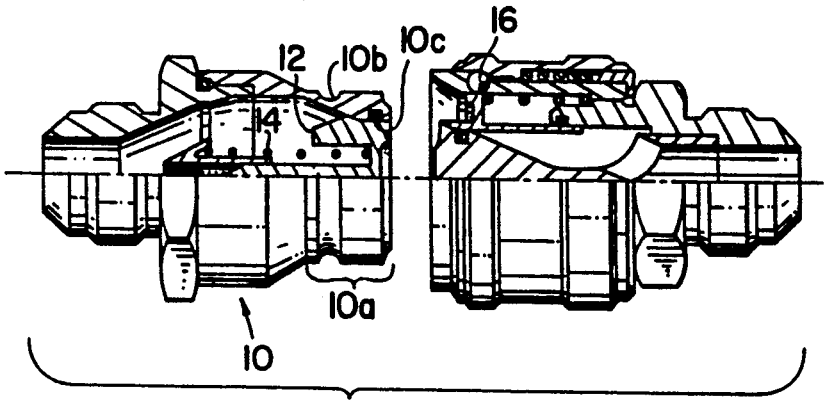
FIG. 1 shows a conventional fluid coupling with the male and female portions illustrated in exploded relationship.

Turning now to the drawings in greater detail, FIG. 1 shows a conventional fluid coupling with the male and female portions illustrated in exploded relationship. The male coupling portion 10 does have a spring loaded plug 12 which is biased into the closed position shown by a spring 14. Upon inserting the male fluid coupling portion into the female coupling portion this plug 12 will be displaced providing a passageway for the fluid to pass through the fluid coupling. The present invention seeks to provide a pressure cap for such a male fluid coupling portion in order to secure the line associated with this male coupling portion from external pressure or force. In the event that the plug 12 were to be inadvertently displaced from the position shown for it in FIG. 1 the seal would be broken and the conventional design has been found to be less than satisfactory in some applications as a result of this defect.

Still with reference to the male coupling portion 10 the end portion thereof has a generally annular shape in the area indicated generally by reference numeral **10*a* and this annular shape defines an external surface of revolution that includes an outwardly facing annular groove 10*b* spaced from the end of the male coupling portion so as to receive ball elements of the type indicated generally at 16** in the female coupling end portion.

Again with reference to the male coupling end portion an internal surface of revolution is also provided with an inwardly facing annular groove **10*c* that is preferably fitted with an O-ring. This O-ring in the groove 10*c* is adapted to seal against the external cylindrical surface of plug 12**.

Figure 2:
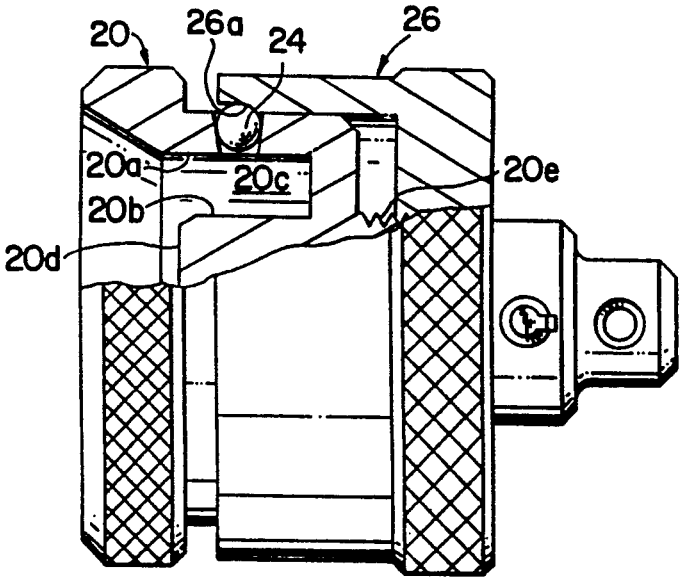
FIG. 2 shows a pressure cap of the present invention adapted to be received on the male fluid coupling portion, the pressure cap in this view is illustrated in an unlocked condition.
Figure 3:
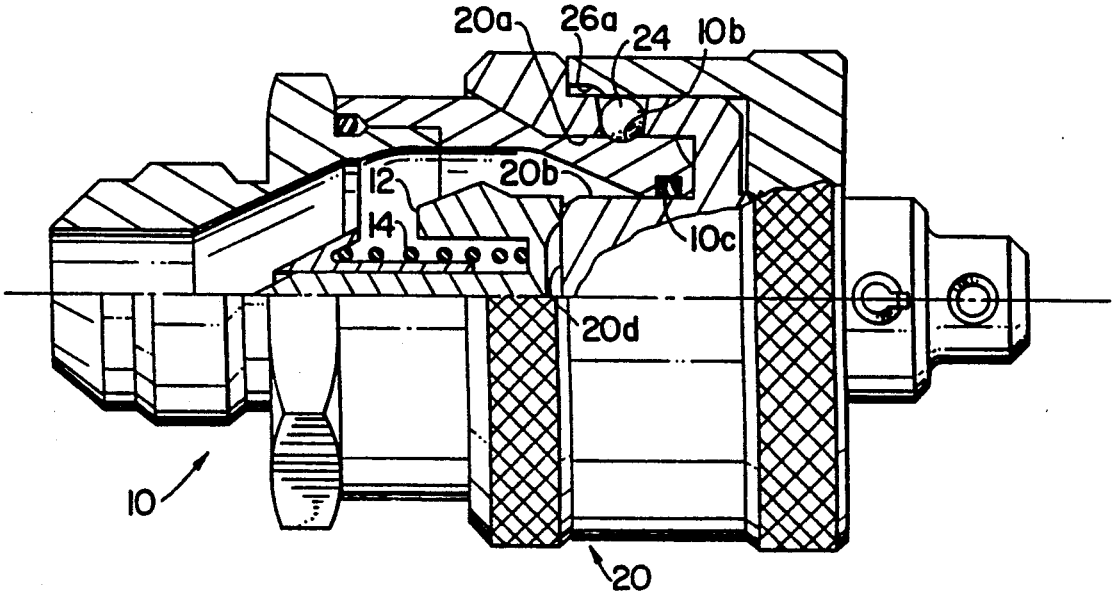
FIG. 3 is a view of the pressure cap in its locked condition on the male fluid coupling to provide a secure seal whereby the quick disconnect male coupling portion is adapted to resist external pressure.

Turning now to a description of the pressure cap or closure of the present invention, FIG. 2 shows a preferred embodiment wherein a ball retaining plug 20 is provided with an outer annular wall **20*a* and with an inner portion 20*b* that cooperate to define an annular slot 20*c* therebetween. Ball elements 24 are provided in openings defined for this purpose in the outer annular wall 20*a* of this plug and these ball elements can be positioned as shown in FIG. 2 so that the ball retaining plug and the pressure cap itself can be inserted on the annular end portion of the male fluid coupling. The annular end portion 10*a* of the fluid coupling 10 is received in the slot 20*c***.

As the pressure cap is so positioned on the end of the male fluid coupling portion the "built-in" plug 12 will be displaced axially inwardly by the end wall **20*d* of the central portion of the plug 20. Once the parts have been so positioned an outer ball locking sleeve 26, threadably received on the plug portion 20***e* as shown in FIG. 2, can be rotated in order to achieve axial displacement of the sleeve 26 relative to the plug 20. As the sleeve 26 is moved relative to the plug 20 an annular camming surface 26*a* acts on the ball elements 24 to urge these ball elements radially inwardly of their openings in the ball retaining plug outer wall 20*a* so that these balls will be received in the annular slot 10*b* of the male fluid coupling portion described earlier.

The center plug portion 20*b* of the plug 20 defines an external cylindrical surface which is fitted to the internal diameter of the male fluid coupling portion 10 so that the O-ring seal provided in the slot 10*c* acts on this surface 20*b* of the plug creating a seal therebetween.

It will be apparent that as so constructed and arranged the pressure cap illustrated in FIG. 2 can be used to seal the male fluid coupling portion from pressure and from forces external to the fluid coupling male portion 10 in a manner not possible with the prior art plug 12 provided in the coupling itself.

What is claimed is:

1. The combination comprising a male fluid coupling portion, said fluid coupling portion having an annular shaped end portion that includes an external surface of revolution defining an outwardly facing annular groove, said annular fluid coupling end portion including an internal surface of revolution that includes an inwardly facing annular groove, an O-ring seal provided in said inwardly facing groove, a ball retaining plug having an inner portion and an outer annular wall cooperating with said inner portion thereof to define an annular slot for receiving the annular shaped male coupling end portion, at least three ball elements provided in radially extending openings in said outer wall of said plug, a ball biasing sleeve threadably received on said plug for axial movement thereon, said sleeve having an annular camming surface for biasing said balls radially inwardly of said openings as said sleeve is threaded in one axial direction, said plug inner portion having an external cylindrical surface of such a diameter that the O-ring seals against it as said sleeve is so threaded on said plug.

2. A pressure cap adapted for use with a male fluid coupling portion wherein the male coupling is of annular shape and has an external surface of revolution that includes an outwardly facing annular groove spaced from the end of the male coupling, and an internal surface of revolution that includes an inwardly facing annular groove fitted with an O-ring seal, the improvement comprising a closure for this male coupling portion which closure includes:

a plug having an inner portion adapted to be received inside the male coupling portion, said plug having an outer annular wall cooperating with said inner portion to define an annular slot for receiving the annular shaped coupling end portion;

ball elements provided for limited radial movement in openings defined by said outer wall of said plug; and a sleeve threadably received on said plug for axial movement thereon, said sleeve having an annular camming surface or biasing said balls radially inwardly of said openings in said outer wall of said plug as said sleeve is threaded in one axial direction, said plug inner portion having an external cylindrical surface of such a diameter that the O-ring seals against it as said sleeve is so threaded on said plug.

3. The combination according to claim 2 wherein said openings in said plug outer wall are tapered so that the inner radial ends of said openings are slightly smaller than the ball diameter, and so that the outer ends of said openings are somewhat greater than said ball diameter.

4. The combination according to claim 3 wherein said sleeve includes a generally tubular portion, one end of which defines said camming surface, and a generally first cylindrical knurled portion at the opposite end of said tubular portion, which first knurled portion having a female thread under the first knurled portion, said plug including a longitudinal portion opposite said plug inner portion having a male thread to engage said female thread underneath the first knurled portion of said tubular portion.

5. The combination according to claim 4 wherein said ball retaining plug also defines a second knurled surface so that axial movement of said plug can be achieved by gripping the first and second knurled portions and rotating one with respect to the other.

* * * * *